United States Patent [19]

Chin et al.

[11] Patent Number: 4,921,824
[45] Date of Patent: May 1, 1990

[54] METAL PASSIVATING CATALYST COMPOSITION FOR CRACKING HYDROCARBONS

[75] Inventors: Arthur A. Chin, Cherry Hill; Michael S. Sarli, Haddonfield, both of N.J.

[73] Assignee: Mobil Oil Corp., New York, N.Y.

[21] Appl. No.: 213,802

[22] Filed: Jun. 30, 1988

[51] Int. Cl.$^5$ .................... B01J 21/00; B01J 29/06
[52] U.S. Cl. .................... 502/65; 502/73; 502/521
[58] Field of Search ............... 502/65, 73, 521

[56] References Cited

U.S. PATENT DOCUMENTS

| | | | |
|---|---|---|---|
| 4,179,409 | 12/1979 | Gladrow et al. | 502/65 |
| 4,187,199 | 2/1988 | Csicsery | 502/65 |
| 4,339,354 | 7/1982 | Gladrow et al. | 502/65 |
| 4,432,890 | 2/1984 | Beck et al. | 502/64 |
| 4,440,868 | 4/1984 | Hettinger, Jr. et al. | 502/65 |
| 4,465,779 | 8/1984 | Occelli et al. | 502/63 |
| 4,515,683 | 5/1985 | Beck et al. | 208/213 |
| 4,549,958 | 10/1985 | Beck et al. | 208/253 |
| 4,588,702 | 5/1986 | Beck et al. | 502/65 |
| 4,707,461 | 11/1987 | Mitchell et al. | 502/64 |

OTHER PUBLICATIONS 2567142, dated Jan. 10, 1986, Chem. Abst. Selects Catalysis (Applied and Physical Aspects) Issued 14, p. 19, Abstract 105:9046p, (1986).

*Primary Examiner*—Carl F. Dees
*Attorney, Agent, or Firm*—Alexander J. McKillop; Charles J. Speciale; Robert B. Furr, Jr.

[57] ABSTRACT

An improved composition and method for passivating vanadium on or in a catalytic cracking catalyst during the process of catalytic cracking of hydrocarbons is described. The improved method comprises mixing discrete particles of lanthanum oxide and, optionally, other rare earth oxides along with the catalyst and the hydrocarbon during the catalytic cracking process.

12 Claims, No Drawings

METAL PASSIVATING CATALYST COMPOSITION FOR CRACKING HYDROCARBONS

The present invention relates to new catalyst compositions for cracking hydrocarbons and to the process of cracking hydrocarbons with the new catalyst compositions. More particularly, the present invention relates to hydrocarbon cracking catalyst compositions containing discrete particles of rare earth oxides such as lanthanum oxide for passivating deleterious metals.

It is often desirable to convert raw mixtures such as crude oil and other petroleum feedstocks to commercially valuable fuels. A number of processes for cracking hydrocarbons are known. These processes include, for example, thermofor catalytic cracking (TCC) and fluid catalytic cracking (FCC) (including the FCC process of Askland/UOP known as reduced crude conversion (RCC)). These procedures are described in the literature; see, for example: Reference for TCC: Gary and Handwerk, "Petroleum Refining - Technology and Economics", Marcel Dekker, Inc., 1975, pg. 90–95. Reference for FCC: Venuto and Habib, "Fluid Catalytic Cracking with Zeolite Catalysts", Marcel Dekker, Inc., 1979. Reference for RCC: Lomas, Hammershaimb, and Yunoki, "RCC Technology for New Installations and FCC Unit Conversion", Japan Petroleum Institute Refining Symposium, 1984.

The cracking of hydrocarbons is accomplished by contacting the hydrocarbon to be cracked with a catalyst at elevated temperatures. The catalysts most commonly used for cracking hydrocarbons comprise a crystalline aluminosilicate zeolite that has been incorporated into a matrix. These zeolites are well known and have been described, for example, in U.S. Pat. Nos. 4,432,890, 4,707,461 and 4,465,779.

The matrix into which the zeolite is incorporated may be natural or synthetic and, typically, has substantially less and in some cases no catalytic activity relative to the zeolite component. Some suitable matrices include clays, silica, and/or metal oxides such as alumina and mixtures thereof.

A major difficulty with cracking catalysts is their tendency to become deactivated following contact with certain heavy metal contaminants present in the hydrocarbon feedback. The deleterious metals include vanadium, nickel, iron and copper, with vanadium being considered the most deleterious. These metals may be present in the hydrocarbon as free metals or as components of inorganic and organic compounds such as porphyrins and asphaltenes. in addition to lost activity, the catalyst becomes non-selective and causes increased amounts of undesirable products such as coke and light gases, i.e., hydrogen, methane and ethane.

Methods for counteracting the deleterious effects of heavy metals have been developed. For example, it is known to treat hydrocarbon feeds containing such metal contaminants with a variety of other metals, which are said to passivate the contaminating metals. These metals may be added to the hydrocarbon feed as the free form of the metal, or as salts or compounds of the metal, for example, the metal oxide or an organometallic compound. It is believed that the passivating metals form complexes with the contaminating metals, and that the complexes are less harmful to the cracking catalysts than are the uncomplexed contaminating metals.

For example, Beck et al., U.S. Pat. No. 4,432,890 (Ashland Oil, Inc.) discloses the addition of metals such as titanium, zirconium, manganese, indium and lanthanum to a cracking unit during the cracking process. The metals or their oxides or salts may be added to the cracking unit incorporated into a catalyst matrix. Alternatively, soluble compounds of the metals, such as organometallic compounds may be added to the cracking unit along with the catalyst and its matrix.

As a further example, Mitchell et al., U.S. Pat. No. 4,707,461 (Chevron Research Company) discloses the addition of a calcium additive such as calcium carbonate during catalytic cracking. The calcium additive may be part of the catalyst matrix or may be introduced separately from the catalyst matrix.

Similarly, Ocelli et al., U.S. Pat. No. 4,465,779, (Gulf Research & Development Company) discloses metal additives for passivating contaminating metals in hydrocarbon feeds. The metal additives are magnesium compounds optionally in combination with a heat-stable metal compound such as an oxide of silicon, aliminum, iron, boron, zirconium, phosphorus and certain clay minerals. The additives described by Ocelli et al. are separate and distinct from the catalyst.

While methods such as those described above for passivating metal contaminants in hydrocarbon feedstocks have been helpful, the recent trend toward the refining of heavier feedstocks containing larger amounts of metal contaminants require still better passivating methods. Accordingly, an objective of the present invention is to provide an improved method for passivating metal contaminants such as vanadium, nickel, iron and copper, and especially vanadium, in hydrocarbon feedstocks during the cracking process. it is a further objective of the present invention to provide an improved catalyst composition for passivating metals on a cracking catalyst during the cracking process.

SUMMARY OF THE INVENTION

These and other objectives of the present invention as will become apparent to those skilled in the art have been met by providing an improvement to the prior art method for passivating vanadium and other deleterious metals on or in a catalytic cracking catalyst during the catalytic cracking of hydrocarbons. The prior art method of passivating comprises adding passivating metals to the catalyst. The improvement comprises adding the passivating metal in the form of discrete particles comprising lanthanum oxide separate from and along with the catalyst and the hydrocarbon during the catalytic cracking process. Thus, the catalyst composition of the present invention comprises a catalyst for cracking hydrocarbon feedstocks and discrete particles comprising lanthanum oxide in a form, size and amount that passivates metal contaminants on or in the catalysts.

DETAILED DESCRIPTION OF THE INVENTION

Lanthanum is the first member of the lanthanide series of metals. The members of the lanthanide series are listed below:

| Atomic number | Name | Symbol | Atomic number | Name | Symbol |
| --- | --- | --- | --- | --- | --- |
| 57 | Lanthanum | La | | | |
| 58 | Cerium | Ce | 65 | Terbium | Tb |

-continued

| Atomic number | Name | Symbol | Atomic number | Name | Symbol |
|---|---|---|---|---|---|
| 59 | Praseodymium | Pr | 66 | Dysprosium | Dy |
| 60 | Neodymium | Nd | 67 | Holmium | Ho |
| 61 | Promethium | Pm | 68 | Erbium | Er |
| 62 | Samarium | Sm | 69 | Thulium | Tm |
| 63 | Europium | Eu | 70 | Ytterbium | Yb |
| 64 | Gadolinium | Gd | 71 | Lutetium | Lu |

The discrete particles used in the present invention may comprise one rare earth oxide or a mixture of rare earth oxides. Where the discrete particle comprises one rare earth oxide, the rare earth oxide is lanthanum. Where the discrete particles comprise a mixture of reare earth oxides, the mixture includes lanthanum and at least one member of the lanthanide series, preferably one or more of the lighter lanthanides, i.e., lanthanum, cerium, praseodymium, neodymium, promethium or samarium.

The rare earth oxides may be obtained from a commercial source or from one or more minerals such as, for example, monazite, bastnaesite, cerite, loparite, orthite, gadolinite, xenotime, and euxenite. These minerals are widely found in nature and are by no means "rare". Monazite and bastnaesite are the preferred sources since they contain 50-80% rare earths, of which 90% consists of the lighter lanthanides. Through normal mining techniques, these ores can be concentrated to give more than 85% rare earth oxides. Purification to 100% rare earth oxides can be achieved by acid leaching and calcination.

It is important for the amount of the rare earth oxide relative to the catalyst in the cracking unit to be sufficient to passivate metal contaminants on or in the catalyst so as to significantly reduce the deleterious effects of the metal contaminants. The ratio of the rare earth oxide to the catalyst may be as low as about 1:100 by weight, preferably about 1:50 by weight and most preferably about 1:40 by weight. The maximum ratio of the rare earth oxide to the catalyst is about 1:3 by weight, preferably about 1:4 by weight and most preferably about 1:5 by weight.

The amount of lanthanum and, optionally, other rare earth oxides in the discrete particles is not critical. The amount of lanthanum and, optionally, of other rare earth oxides in the discrete particles may be as little as about 25%, but is preferably at least about 50% and more preferably at least about 75%. In general, the greater the amount of lanthanum in the discrete particle, the better the improvement in catalyst performance will be. Therefore, the optimal discrete particle will consist essentially of lanthanum oxide.

Other active (i.e. metal passivating) materials, such as other rare earth oxides as discussed above or other materials known to passivate deleterious metals, may also be present. Such other materials will generally improve catalyst performance, but not as much as will lanthanum oxide.

The inert material, if any, that makes up the remainder of the discrete particle in addition to the lanthanum oxide and other active compounds may be any material that is catalytically inert with respect to the hydrocarbon feedstock. Inert means inactive or significantly less active than the catalyst that is used in the process. This material may be, for example, the other components of an ore that also contains sufficient rare earth oxides to be useful as the discrete particle in the present invention.

The inert material that makes up the remainder of the discrete particle may also be a matrix added in order to confer a useful property such as increased strength on the particle. The same materials useful as inert matrices in known cracking catalysts and sorbents for cracking processes may also be used as the inert material in the discrete particles of the present invention. Some suitable inert materials include clays, aluminates, silicates, titanates, zirconates and inorganic oxides such as silica and metal oxides, and mixtures thereof. Some useful metal oxides include, for example, alumina, titania, boria, magnesia and zirconia. Such matrices are well known and are described, for example, in U.S. Pat. Nos. 4,707,461, and 4,465,779.

Some clays useful as matrices include, for example, bentonite, kaolin, montmorillonite, smectite, mullite, pumice and laterite. An example of a useful matrix containing clay is described in detail in U.S. Pat. No. 4,432,890, at column 11, line 25 to column 12, line 17. The disclosure of this matrix is incorporated herein by reference. Some additional suitable examples of clays useful as matrices in the present invention are described in U.S. Pat. No. 4,513,093 at column 8, lines 20-30. The disclosure of these clays is incorporated herein by reference.

The size of the discrete particles is not critical, and is preferably approximately the same as the size of the cracking catalyst. For example, the minumum size of the discrete particles is approximately about 10 microns, preferably about 20 microns and more preferably about 40 microns. The maximum size of the discrete particles is approximately about 200 microns, preferably about 150 microns and more preferably about 100 microns.

The pore size of the rare earth oxides-containing particle is not critical. Any pore size capable of trapping the metal contaminants will be suitable. Preferably, the pore size is large enough so that resid molecules, where metal contaminants are concentrated, will have access to the rare earth oxide.

Particles suitable for use in the present invention can be prepared by processes known in the art. For example, the particles may be ground from larger particles or spray-dried from slurries and then fractionated so as to obtain particles having the desired size. The particles may optionally be calcined.

Where the rare earth oxide is bound to a matrix, the metal may be added to the matrix by processes known in the art. It is preferred that the rare earth oxide exists as a separate entity in the discrete particle. Therefore, the rare earth oxide is preferably not impregnated, ion exchanged or precipitated onto a support or matrix, such that the chemical state or coordination of the rare earth is altered from the binary oxide form. The preferred method for combining the rare earth oxide and inert material is by spray-drying, which leaves the $La_2O_3$ as a separate, chemically unaltered entity.

An example of the spray drying of kaolin clay, which is one of the many possible materials useful as a particles matrix in the present invention, is given starting at column 11, line 10 of U.S. Pat. No. 4,513,093. This example may be adapted for making particles in accordance with present invention, and is incorporated by reference in the present specification.

The rare earth oxide particles described above are intended for use in cracking processes that are already known in the art. Such processes include, for example, fluid bed catalytic cracking, thermofor catalytic cracking and reduced crude conversion. An additional advantage of adding the passivating agent independently of the catalyst is the flexibility it allows the refiner to respond to changes and fluctuations in the feedstock.

The cracking of hydrocarbon feedstocks occurs in the presence of cracking catalysts such as zeolites. The particles of the present invention are intended to be added to a cracking unit as separate discrete particles along with the cracking catalyst. Any cracking catalyst that is adversely affected by heavy metal contaminants will benefit from being used along with the particles of the invention. Some natural zeolites typically used in the cracking process include faujasite, mordenite and erionite. The natural zeolites may be treated so as to produce synthetic zeolites such as, for example, Zeolites X, Y, A, L, ZK-4, B, E, F, H, J, M, Q, T, W, Z, alpha, beta, ZSM-5 and omega. Additional cracking catalysts are described, for example, in Venuto and Habib, "Fluid Catalytic Cracking with Zeolite Catalysts", Marcel Dekker, Inc., Page 30 (1979).

The hydrocarbon feedstock that can be used with the present invention includes any such feedstock that contains heavy metal contaminants that reduce the activity of cracking catalysts. The feedstock may, for example, be a whole crude oil, a light fraction of crude oil, a heavy fraction of crude oil, or other fractions containing heavy residua, co-derived oils, shale oils, and the like.

EXAMPLES

EXAMPLE 1

A physical mixture of fresh Davison RC-25 (commercial REY catalyst - Table 1) and 6000 ppm V, added as $V_2O_5$ powder (Fisher), was steamed at 1450° F. for 10 hours in a 45/55 steam/air mixture at 1 atmosphere pressure. This procedure simulates vanadium deactivation of FCC catalysts under commercial conditions. Catalyst activity was measured in a fixed-fluidized bed FCC unit (850° F., 2 cat/oil, 5 min-on-stream, Light East Texas gas oil feed - Table 2). Results of the test are given in Table 3.

EXAMPLE 2

A blend containing 15 wt % $La_2O_3$ (Fisher) and 85 wt % Davison RC-25 was mixed with $V_2O_5$ to give 6000 ppm V. The mixture was steamed and tested under the same conditions as described in Example 1 to determine the effect of vanadium on the catalyst in the presence of a passivator. The results of the test are given in Table 3. Compared to Example 1 with no additive, an approximately 40% increase in conversion is obtained. Vanadium dehydrogenation activity is also suppressed by about 40%. UOP dynamic activity (Oil & Gas Journal, Jan. 26, 1987, pgs. 73-77), a measure of conversion for a given coke make, is about 60% higher.

EXAMPLES 3-6

$CaCO_3$ (Fisher), MgO (Fisher), $ZrO_2$ (Fisher) and $CeO_2$ (Aldrich) were mixed with Davison RC-25 and $V_2O_5$ in the same proportions as described in Example 2. The mixtures were steamed and tested under the conditions described in Example 1. The results of these tests are also shown in Table 3.

Although both $CaCO_3$ and MgO showed high effectiveness for reducing vanadium deactivation of FCC catalysts, Table 3 clearly shows that $La_2O_3$ gives superior performance. With $La_2O_3$, the unexpected result of excellent activity retention and significant reduction in coke and hydrogen yields are achieved. $ZrO_2$ was essentially ineffective. The $CeO_2$ was about half as effective as $La_2O_3$. However, its coke selectivity was better than the MgO blend and approached that of $CaCO_3$. Hence, mixtures of rare earth oxides especially if rich in lanthanum and cerium should excel in FCC unit performance.

EXAMPLE 7

A physical mixture of fresh Davison Super-D (commercial REY catalyst - Table I) and 6000 ppm V, added as $V_2O_5$ powder, was steamed and tested under the conditions described in Example 1. Results of the test are given in Table 4. Davison Super-D is considerably more susceptible to vanadium poisoning than RC-25.

EXAMPLE 8-10

Physical blends containing 3/97, 5/95, and 15/85 (wt/wt) $La_2O_3$ (Fisher)/Davison Super-D were mixed with $V_2O_5$ to give 6000 ppm V. The mixtures were steamed and tested under the conditions described in Example 1 to determine the effect of vanadium on Super-D catalyst in the presence of different levels of $La_2O_3$. The results of the tests are given in Table 4. Compared to Example 7 with no lanthanum addition, conversion increases in excess of 30 vol% were obtained, even with just 3% $La_2O_3$. Dehydrogenation activity was reduced, with about 22% higher UOP dynamic activity and 20% lower hydrogen formation.

EXAMPLE 11

An $NH_4NO_3$-exchanged silica-alumina-clay matrix (75.6% $SiO_2$, 17.1% $Al_2O_3$) was calcined at 1000° F. for 2 hours and impregnated with an aqueous solution of lanthanum nitrate (143 g $La(NO_3)_3$—$6H_2O$ in 95 cc $H_2O$) to incipient wetness. The product was then dried at 250° F. La content of the La impregnated matrix was 18.4 wt %, as determined by x-ray fluorescence.

A 15/85 (wt/wt) physical blend of the La impregnated matrix and fresh Davison Super-D catalyst was made. This gave a final product containing 2.8 wt % added La (or 3.2 wt % calculated) as $La_2O_3$). $V_2O_5$ was next added to give 6000 ppm V. The mixture was then steamed and tested under the conditions described in Example 1. The results of the pilot unit tests are given in Table 4. It is clear that the La impregnated matrix is not as effective as pure $La_2O_3$ (Example 8). Despite some improvement in conversion and coke selectivity, hydrogen yield actually increases 2-fold.

EXAMPLE 12

Fresh Davison Super-D catalyst was impregnated with an aqueous solution of lanthanum nitrate to incipient wetness. The finished product contained 4.3 wt % added La (5.0 wt % calculated as $La_2O_3$). $V_2O_5$ was then added to give 6000 ppm. V. The mixture was steamed and tested under the conditions described in Example 1. The results of the pilot unit test are shown in Table 4. This example illustrates that La impregnated directly to the catalyst is also not as effective as adding pure $La_2O_3$ (Example 9). Although comparable activity retention was obtained, essentially no reduction in dehydrogenation activity (coke and $H_2$) was found.

EXAMPLES 7-12 serve to illustrate the unexpected advantage of adding pure $La_2O_3$ as a separate particle additive over other methods of La incorporation to the FCC catalyst. Other techniques were also examined (although no shown as Examples). For example, La addition via ion-exchange resulted in negligible improvement in activity due to low exchange capacity of the $SiO_2/Al_2O_3$ matrix.

TABLE 1

| Fresh FCC Catalyst Properties | | |
| --- | --- | --- |
| | RC-25 | Super D |
| $Al_2O_3$, wt % | 29.2 | 28.4 |
| Surface Area, m²/g | 161 | 144 |
| Pore Volume, cc/g | 0.40 | 0.33 |
| Rare Earth Oxides, wt % | 3.3 | 2.9 |
| Na, ppm | 3700 | 3400 |

TABLE 2

| Light East Texas Gas Oil Feedstock Properties | |
| --- | --- |
| API | 36.4 |
| Distillation (D1160): | |
| IBP, °F. (vol %) | 455 |
| 10% | 489 |
| 30% | 515 |
| 50% | 548 |
| 70% | 585 |
| 90% | 646 |
| EP | 687 |
| Bromine No. | 0.50 |
| KV @ 100° C., cs | 1.30 |
| Molecular Weight | 269 |
| Pour Point, °F. | 20 |
| CCR, wt % | 0.02 |
| Refractive Index @ 70° C. | 1.4492 |
| Aniline Point, °F. | 168 |
| Hydrogen, wt % | 13.3 |
| Sulfur, wt % | 0.13 |
| Total Nitrogen, ppm | 300 |
| Basic Nitrogen, ppm | 45 |
| Nickel, ppm | 0.1 |
| Vanadium, ppm | 0.1 |
| Iron, ppm | 0.77 |
| Copper, ppm | 0.05 |
| Paraffins, wt % | 44.7 |
| Naphthenes, wt % | 33.2 |
| Aromatics, wt % | 22.1 |

TABLE 3

| Activity Retention of V-Containing Catalyst Trap Mixtures | | | | | | |
| --- | --- | --- | --- | --- | --- | --- |
| Example | Additive | Conversion (vol %) | Gasoline (vol %) | Coke (wt %) | H (wt %) | UOP Dynamic Activity |
| 1 | None | 56.4 | 47.2 | 1.26 | 0.05 | 1.03 |
| 2 | $La_2O_3$ | 76.0 | 61.3 | 1.93 | 0.03 | 1.64 |
| 3 | $CeO_2$ | 65.6 | 53.6 | 1.43 | 0.06 | 1.33 |
| 4 | $CaCO_3$ | 73.1 | 58.5 | 1.81 | 0.04 | 1.50 |
| 5 | MgO | 74.5 | 59.3 | 2.30 | 0.06 | 1.27 |
| 6 | $ZrO_2$ | 58.4 | 47.3 | 1.51 | 0.06 | 0.93 |

Base catalyst - Davison RC-25
Trap added at 15 wt % level; mixtures contain 6000 ppm V
Conversion = Vol % of feed converted to /430° F. products
Gasoline - 430° F. EP
UOP Dynamic Activity = (Conv/(100-Conv))/Coke

TABLE 4

| Cracking Characteristics of V-Containing Catalyst/La Mixtures | | | | | |
| --- | --- | --- | --- | --- | --- |
| Example | La Content (as $La_2O_3$) (wt %) | Conversion (vol %) | Gasoline (vol %) | Coke (wt %) | H (wt %) | UOP Dynamic Activity |
| 7 | None | 35.7 | 31.8 | 0.46 | 0.05 | 1.21 |
| $La_2O_3$ Powder: | | | | | | |
| 8 | 3 | 67.3 | 55.6 | 1.39 | 0.04 | 1.48 |
| 9 | 5 | 67.9 | 56.5 | 1.41 | 0.04 | 1.50 |
| 10 | 15 | 70.2 | 56.5 | 1.61 | 0.04 | 1.46 |
| La Impregnation: | | | | | | |
| 11 | 3.2* | 60.3 | 50.6 | 1.12 | 0.09 | 1.36 |
| 12 | 5** | 66.8 | 55.2 | 1.63 | 0.07 | 1.23 |

Base catalyst - Davison Super-D
Mixtures contain 6000 ppm V
Conversion = Vol % of feed converted to /430° F. products
Gasoline - 430° F. EP
UOP Dynamic Activity = (Conv/(100-Conv))/Coke Notes:
*impregnation to $SiO_2/Al_2O_3$/clay matrix: 85/15 (wt/wt) Super-D catalyst matrix blend used
**impregnation to Super-D catalyst

We claim:

1. In a method for passivating vanadium on or in a catalytic cracking catalyst during the process of catalytic cracking of hydrocarbons, the method of passivating comprising adding passivating metals to the catalyst, the improvement comprising adding the passivating metal in the form of discrete particles comprising lanthanum oxide sepatate from and along with the catalyst and the hydrocarbon during the catalytic cracking process.

2. The method according to claim 1 wherein the discrete particles consist essentially of lanthanum oxide.

3. The method according to claim 1 wherein the discrete particles further comprise at least one additional rare earth oxide.

4. The method according to claim 3 wherein the additional rare earth oxide is one or more of cerium, praseodymium, neodymium, promethium, or samarium.

5. The method according to claim 1 wherein the lanthanum oxide is bound to a matrix that is inert with respect to cracking hydrocarbons.

6. The method according to claim 4 wherein the matrix comprises a clay, silica, a metal oxide or mixtures thereof.

7. A composition suitable for use as a catalyst in a hydrocarbon cracking process comprising a cracking catalyst and separate and discrete particles comprising lanthanum oxide in a size and amount sufficient to significantly passivate metal contaminants on or in the catalyst during the cracking process.

8. The composition of claim 7 wherein the discrete particles consist essentially of lanthanum oxide.

9. The composition of claim 7 wherein the discrete particles further comprise at least one additional rare earth oxide.

10. The composition according to claim 9 wherein the additional rare earth oxide is one or more of cerium, praseodymium, neodymium, promethium, or samarium.

11. The composition according to claim 7 wherein the lanthanum oxide is bound to a matrix that is inert with respect to cracking hydrocarbons.

12. The composition according to claim 11 wherein the matrix comprises a clay, silica, a metal oxide or mixtures thereof.

* * * * *

UNITED STATES PATENT AND TRADEMARK OFFICE
CERTIFICATE OF CORRECTION

PATENT NO.  : 4,921,824
DATED       : 5/1/90
INVENTOR(S) : A.A. Chin et al

It is certified that error appears in the above-identified patent and that said Letters Patent is hereby corrected as shown below:

Col. 3, line 15, "reare" should be —rare—

Col. 7, line 6, "no" should be —not—

Col. 8, claim 7, line 48, delete second occurrence of "and"

Signed and Sealed this

Twenty-seventh Day of August, 1991

Attest:

HARRY F. MANBECK, JR.

*Attesting Officer*

*Commissioner of Patents and Trademarks*